United States Patent
Takagi et al.

(10) Patent No.: US 11,851,557 B2
(45) Date of Patent: *Dec. 26, 2023

(54) CURABLE COMPOSITION, CURED PRODUCT AND LAMINATE

(71) Applicant: AGC Inc., Chiyoda-ku (JP)

(72) Inventors: Keisuke Takagi, Chiyoda-ku (JP); Takashi Sasaki, Chiyoda-ku (JP); Tomoaki Sakurada, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 260 days.

This patent is subject to a terminal disclaimer.

(21) Appl. No.: 16/778,050

(22) Filed: Jan. 31, 2020

(65) Prior Publication Data

US 2020/0263021 A1    Aug. 20, 2020

(30) Foreign Application Priority Data

Feb. 15, 2019  (JP) .................................. 2019-025668
Dec. 17, 2019  (JP) .................................. 2019-227662

(51) Int. Cl.
*C08L 33/08* (2006.01)
*C08L 33/14* (2006.01)

(52) U.S. Cl.
CPC .............. *C08L 33/08* (2013.01); *C08L 33/14* (2013.01); *C08L 2201/08* (2013.01)

(58) Field of Classification Search
CPC ...................................................... C08L 33/08
See application file for complete search history.

(56) References Cited

U.S. PATENT DOCUMENTS

| | | | |
|---|---|---|---|
| 5,605,999 A | * | 2/1997 | Chu .................... C08F 290/148 526/279 |
| 5,888,649 A | * | 3/1999 | Curatolo .................... C09J 7/22 428/354 |
| 2006/0204679 A1 | * | 9/2006 | Jones ..................... B82Y 20/00 428/1.3 |
| 2012/0115977 A1 | * | 5/2012 | Martin ..................... C09D 4/00 522/167 |
| 2013/0209931 A1 | * | 8/2013 | Sato ................... G03G 9/08797 430/137.14 |
| 2018/0273656 A1 | * | 9/2018 | Takagi ...................... C08F 2/48 |
| 2020/0165411 A1 | * | 5/2020 | Takagi ................... C08K 5/101 |

FOREIGN PATENT DOCUMENTS

| | | | |
|---|---|---|---|
| CN | 102076723 | | 5/2011 |
| CN | 106415393 | | 2/2017 |
| JP | 2006193650 | * | 7/2006 |
| JP | 2018-008518 A | | 1/2018 |
| WO | WO 2012/056972 A1 | | 5/2012 |

OTHER PUBLICATIONS

Aerosil R972 flyer (Year: 2009).*
WO2017/099184 (Year: 2017).*

* cited by examiner

*Primary Examiner* — Irina Krylova

(74) *Attorney, Agent, or Firm* — Oblon, McClelland, Maier & Neustadt, L.L.P.

(57) ABSTRACT

To provide a curable composition being excellent in curability and being capable of forming a cured product which is excellent in heat resistance, which is excellent in adhesion to an inorganic substrate or an inorganic compound layer, and which is hardly peeled even when exposed to a high temperature/high humidity environment for a long time, a cured product formed by curing the curable composition, and a laminate.

A curable composition comprising specific metal oxide fine particles A, a specific (meth)acrylate B, a specific antioxidant, an organopolysiloxane and a radical polymerization initiator, which may further contain a specific epoxy (meth)acrylate C, and which may further contain a specific urethane (meth)acrylate D. A cured product formed by curing the curable composition, and a laminate having the cured product.

11 Claims, No Drawings

CURABLE COMPOSITION, CURED PRODUCT AND LAMINATE

TECHNICAL FIELD

The present invention relates to a curable composition, a cured product and a laminate.

BACKGROUND ART

A cured product formed by curing a curable composition has such merits that (i) by an imprinting method, a cast molding method or the like, from a curable composition, cured products of various shapes can be formed in a short time, (ii) it is less likely to break as compared with glass, and (iii) it is light in weight as compared with glass, and thus has attracted attention as a material for an optical member in place of glass.

Patent Document 1 discloses a curable composition comprising an alicyclic epoxy compound, a cationic polymerization initiator and an organopolysiloxane.

PRIOR ART DOCUMENTS

Patent Documents

Patent Document 1: JP-A-2018-008518

DISCLOSURE OF INVENTION

Technical Problem

However, a curable composition which is cured by cationic polymerization as disclosed in Patent Document 1 is inferior in curability as compared with a curable composition which is cured by radical polymerization, and the obtainable cured product is insufficient in heat resistance. When a laminate comprising a cured product of the curable composition laminated on an inorganic substrate such as a glass substrate or an inorganic compound layer such as a metal oxide film is used in a high temperature/high humidity environment for a long time, the adhesion between layers may decrease, thus leading to peeling.

The object of the present invention is to provide a curable composition being excellent in curability and being capable of forming a cured product which is excellent in heat resistance, which is excellent in adhesion to an inorganic substrate or an inorganic compound layer, and which is hardly peeled even when exposed to a high temperature/high humidity environment for a long time, a cured product formed by curing the curable composition, and a laminate.

Solution to Problem

According to an embodiment of the present invention, provided is a curable composition comprising
  metal oxide fine particles A which have no aromatic ring and which have a median diameter of from 5 to 20 nm,
  a (meth)acrylate B which has an alicyclic condensed ring, and of which the glass transition temperature of the homopolymer is from 90 to 350° C., excluding an organopolysiloxane,
  an antioxidant,
  an organopolysiloxane, and
  a radical polymerization initiator,
  which may further contain an epoxy (meth)acrylate C which has no aromatic ring, and in which the amount of substance of ethylenically unsaturated groups is from 0.1 to 3.0 mmol/g, excluding an organopolysiloxane and the (meth)acrylate B,
  which may further contain a urethane (meth)acrylate D which has no aromatic ring, excluding an organopolysiloxane, the (meth)acrylate B and the epoxy (meth)acrylate C, and
  wherein the antioxidant contains an antioxidant having a phenol moiety, and an antioxidant having a sulfide moiety excluding the antioxidant having a phenol moiety.

Advantageous Effects of Invention

According to the present invention, it is possible to provide a curable composition being excellent in curing property and being capable of forming a cured product which is excellent in heat resistance, which is excellent in adhesion to an inorganic substrate or an inorganic compound, and which is hardly peeled even when exposed to a high temperature/high humidity environment for a long time, a cured product formed by curing the curable composition, and a laminate.

DESCRIPTION OF EMBODIMENTS

[Meanings of Terms]

A "(meth)acryloyl group" is a general term for an acryloyl group and a methacryloyl group.

A "(meth)acrylate" is a general term for an acrylate and a methacrylate.

"(Meth)acrylic acid" is a general term for acrylic acid and methacrylic acid.

"Light" is a general term for ultraviolet light, visible light, infrared light, electron beam and radiation.

The organic component in the metal oxide fine particles A is the thermogravimetric reduction amount at the time when the metal oxide fine particles A are heated at a rate of 25° C./min from 10° C. to 500° C. under a nitrogen atmosphere, by using a thermogravimetric measuring apparatus.

The median diameter of the metal oxide fine particles A in the curable composition is a value obtained by using a particle size distribution measuring apparatus by a dynamic light scattering method.

The median diameter of the metal oxide fine particles A in the cured product is a value obtained by observing a thin specimen by a transmission electron microscope, measuring diameters with respect to a sufficient number (for example at least 100, preferably at least 200) of metal oxide fine particles A which can be confirmed in the thin specimen, and averaging them.

The glass transition temperature of a homopolymer of a (meth)acrylate is a midpoint glass transition temperature measured by a differential scanning calorimetry (DSC) method in accordance with JIS K7121-1987 (corresponding International Standard ISO 3146) with respect to a homopolymer for evaluation obtained by the method as described in Examples. A glass transition temperature of a homopolymer being from 90 to 350° C. shall include, in addition to one, of which the glass transition temperature is observed at 350° C. or less, one, of which the glass transition temperature is not observed at 350° C. or less by a DSC method.

The transmittance of light having a wavelength of 400 nm of a cured product is a value measured at 25° C. by using light having a wavelength of 400 nm by the method described in JIS K7361:1997 (ISO 13468-1:1996), with respect to a cured product of an evaluation sample obtained by the method as described in Examples.

The "weight average molecular weight" (hereinafter referred to as "Mw") is a molecular weight as calculated as polystyrene, measured by an analytical curve prepared by using a polystyrene having a known molecular weight by means of gel permeation chromatography employing tetrahydrofuran as an eluent.

The expression "to" showing a numerical range is meant to include the numerical values given before and after the expression as the lower limit value and the upper limit value.

[Curable Composition]

The curable composition of the present invention essentially comprises metal oxide fine particles A, a (meth)acrylate B, an organopolysiloxane, an antioxidant and a radical polymerization initiator. The curable composition of the present invention may further contain an epoxy (meth)acrylate C. The curable composition of the present invention may further contain a urethane (meth)acrylate D. Further, the curable composition of the present invention may contain other (meth)acrylates, additives, a solvent, etc. as the case requires.

The metal oxide fine particles A are metal oxide fine particles which have no aromatic ring and which have a median diameter of from 5 to 20 nm. The Abbe number of an obtainable cured product will improve by the metal oxide fine particles A. The metal oxide fine particles A hardly undergo denaturation such as oxidative degradation and changes of shape even in a high temperature/high humidity environment.

The metal oxide fine particles A may be metal oxide fine particles surface-modified with an organic substance. "The metal oxide fine particles A which have no aromatic ring" are metal oxide fine particles A not surface-modified with an organic substance, or metal oxide fine particles A surface-modified with an organic substance having no aromatic ring.

The metal species of the metal oxide fine particles A may, for example, be Si, Zr, Ti, Al, Ce, Fe, W, Zn or Y. In view of compatibility with other components and availability, the metal species of the metal oxide fine particles A is preferably at least one member selected from the group consisting of Si, Zr, Ti, Al, Ce, Fe, W, Zn and Y, more preferably at least one member selected from the group consisting of Si, Zr and Ti, further preferably either one or both of Si and Zr.

The metal oxide fine particles A may, for example, be $SiO_2$ fine particles, $ZrO_2$ fine particles, $TiO_2$ fine particles, $Al_2O_3$ fine particles, $CeO_2$ fine particles, $Fe_3O_4$ fine particles, $WO_3$ fine particles, ZnO fine particles or $Y_2O_3$ fine particles. In view of compatibility with other components and availability, the metal oxide fine particles A are preferably at least one member selected from the group consisting of $SiO_2$ fine particles, $ZrO_2$ fine particles, $TiO_2$ fine particles, $Al_2O_3$ fine particles, $CeO_2$ fine particles, $Fe_3O_4$ fine particles, $WO_3$ fine particles, ZnO fine particles and $Y_2O_3$ fine particles, more preferably at least one member selected from the group consisting of $SiO_2$ fine particles, $ZrO_2$ fine particles and $TiO_2$ fine particles, further preferably either one or both of $SiO_2$ fine particles and $ZrO_2$ fine particles.

In a case where the metal oxide fine particles A are surface-modified with an organic substance, surface modification with an organic substance may, for example, be covering of the surface of the fine particles with an organic substance by surface treatment, or deposition of an organic substance on the surface of the fine particles by electrostatic interactions and intermolecular forces such as a hydrogen bond.

The organic substance used for the surface modification of the metal oxide fine particles A may, for example, be an organic silicon compound, an organic phosphorus compound or an organic sulfur compound.

The proportion of the organic component in the metal oxide fine particles A is preferably at most 20 mass %, more preferably at most 10 mass %, further preferably at most 5 mass %, particularly preferably at most 3 mass %, most preferably at most 1 mass %. When the proportion of the organic component in the metal oxide fine particles A is at most the above upper limit value, yellowing by oxidation of the organic substance in a high temperature/high humidity environment will be suppressed, and a decrease in transparency of the obtainable cured product can be suppressed. The proportion of the organic component in the metal oxide fine particles A is preferably as low as possible, and the lower limit value of the proportion of the organic component is 0 mass %.

The metal oxide fine particles A may be spherical, may be linear, or may have another shape. Particularly, the metal oxide fine particles A are preferably spherical, whereby the particles are hardly aggregated, and a decrease in transparency of a cured product will be suppressed.

The metal oxide fine particles A may be solid particles or may be hollow particles. Particularly, the metal oxide fine particles A are preferably solid, whereby the refractive index will be high, and loss of the transmittance will be less.

The median diameter of the metal oxide fine particles A is from 5 to 20 nm, preferably from 6 to 15 nm, more preferably from 7 to 10 nm. When the median diameter of the metal oxide fine particles A is at least the lower limit value in the above range, handling efficiency will be good. Further, since the metal oxide fine particles A are less likely to be aggregated, transparency of the obtainable cured product will be high. When the median diameter of the metal oxide fine particles A is at most the upper limit value in the above range, scattering of light due to the metal oxide fine particles A will be less, and transparency of the curable composition and the obtainable cured product will be high.

As the metal oxide fine particles A, commercial products may be used.

Commercial products of the metal oxide fine particles A may be ORGANOSILICASOL (MEK-ST-40, TOL-ST, IPA-ST, MEK-ST-UP, EG-ST, NPC-ST-30 etc. manufactured by Nissan Chemical Corporation), a surface-modified zirconia particles dispersion (ZIRCOSTAR ZP-153-A manufactured by NIPPON SHOKUBAI CO., LTD., PCPR-50-ETA manufactured by pixelligent, etc.), a titania sol (Optolake 6320z (11RU-7•MK) manufactured by catalyst and chemical) etc.

As the metal oxide fine particles A contained in the curable composition, one type may be used alone, or two or more types may be used in combination.

The (meth)acrylate B is a (meth)acrylate which has an alicyclic condensed ring, and of which the glass transition temperature of the homopolymer is from 90 to 350° C. (excluding an organopolysiloxane).

The (meth)acrylate B, which has an ethylenically unsaturated group, can undergo radical polymerization by light or heat. The curable composition of the present invention is cured by radical polymerization by a combination of the (meth)acrylate B and a radical polymerization initiator, and is thereby excellent in curability, and the obtained cured product is excellent in heat resistance.

The (meth)acrylate B preferably contains no aromatic ring. By the (meth)acrylate B having no aromatic ring with a low Abbe number and having an alicyclic structure with a high Abbe number, the Abbe number of the cured product will improve.

An alicyclic condensed ring is one in which a plurality of alicyclic rings are condensed. The alicyclic condensed ring has a high bonding force between carbon atoms and is less likely to undergo oxidation or bond cleavage in a high temperature/high humidity environment. Accordingly, by the (meth)acrylate B having an alicyclic condensed ring, the obtainable cured product is less likely to be colored, and the transparency is less likely to be lowered.

The alicyclic condensed ring is, from the viewpoint of availability of the (meth)acrylate B, preferably a ring derived from at least one group selected from the group consisting of a norbornyl group, an isobornyl group, a tricyclodecanyl group, a dicyclopentanyl group, a tetracyclododecanyl group, a noradamantyl group, an adamantly group and an amantyl group. Among them, an isobornyl group or a dicyclopentanyl group is preferred.

The number of the ethylenically unsaturated group which the (meth)acrylate B has, is preferably one or two, particularly preferably one, from the viewpoint of availability and the magnitude of the proportion of the alicyclic condensed ring occupying in the molecule.

The glass transition temperature of the homopolymer of the (meth)acrylate B is from 90 to 350° C., preferably from 150 to 350° C., more preferably from 200 to 350° C., further preferably from 250 to 350° C. When the glass transition temperature of the homopolymer is at least the lower limit value in the above range, the cured product is less likely to be softened in a high temperature/high humidity environment, and the cured product will be excellent in various properties. When the glass transition temperature of the homopolymer is at most the upper limit value in the above range, such a (meth)acrylate B is readily available.

The (meth)acrylate B may be dicyclopentanyl acrylate, dicyclopentanyl methacrylate, isobornyl acrylate, isobornyl methacrylate, 1-adamantyl methacrylate, 2-adamantyl acrylate, tricyclodecane dimethanol diacrylate, etc.

As the (meth)acrylate B contained in the curable composition, one type may be used alone, or two or more types may be used in combination.

The epoxy (meth)acrylate C is an epoxy (meth)acrylate which has no aromatic ring and in which the amount of substance of ethylenically unsaturated groups is from 0.1 to 3.0 mmol/g (excluding an organopolysiloxane and the (meth)acrylate B).

The epoxy (meth)acrylate C is one obtained by adding (meth)acrylic acid to an epoxy compound. The epoxy (meth)acrylate C has a hydroxy group formed by the ring opening of an epoxy group, whereby the compatibility particularly with the metal oxide fine particles A having a silanol group on the surface will be good. Further, the compatibility is good also with the (meth)acrylate B. Therefore, in a curable composition containing the epoxy (meth)acrylate C, the metal oxide fine particles A, the (meth)acrylate B and the epoxy (meth)acrylate C are compatible, and as a result, the transparency of the cured product will be high.

The epoxy (meth)acrylate C has no aromatic ring. By the epoxy (meth)acrylate C having no aromatic ring, reduction of the Abbe number of the cured product can be suppressed.

In the epoxy (meth)acrylate C, the amount of substance of ethylenically unsaturated groups is, per 1 g of the epoxy (meth)acrylate C, from 0.1 to 3.0 mmol/g, preferably from 0.3 to 2.7 mmol/g, more preferably from 0.5 to 2.5 mmol/g. When the amount of substance of ethylenically unsaturated groups is at least the lower limit value in the above range, the curable composition can be sufficiently cured. When the amount of substance of ethylenically unsaturated groups is at most the upper limit value in the above range, the cured product is less likely to shrink at the time of curing the curable composition, and cracks are less likely to be formed in the cured product. Therefore, the cured product can be suitably used as an optical member.

Commercial products of the epoxy (meth)acrylate C may be NK Oligo (EA-5311, EA-5511, etc.) manufactured by Shin-Nakamura Chemical Co., Ltd., Denacol acrylates (DA-722, DA-314, etc.) manufactured by Nagase ChemteX Corporation, and epoxy acrylates (Miramer PE230, etc.) manufactured by MIWON.

The urethane (meth)acrylate D is a urethane (meth)acrylate which has no aromatic ring (excluding an organopolysiloxane, the (meth)acrylate B and the epoxy (meth)acrylate C).

Since the urethane (meth)acrylate D has no aromatic ring lowering the Abbe number, a decrease of the Abbe number of the obtainable cured product will be suppressed.

The urethane (meth)acrylate D has a urethane bond and has at least two (meth)acryloyl groups. The urethane (meth)acrylate D has a urethane bond showing hydrogen bonding properties, whereby the compatibility particularly with the metal oxide fine particles A having a silanol group on the surface is good. Further, the compatibility is good also with the (meth)acrylate B and the epoxy (meth)acrylate C. Therefore, in a curable composition containing the urethane (meth)acrylate D, the metal oxide fine particles A, the (meth)acrylate B, the epoxy (meth)acrylate C and the urethane (meth)acrylate D are compatible, and as a result, the transparency of the cured product will be high. Further, the urethane (meth)acrylate D has a urethane bond showing hydrogen bonding properties, and the flexibility of the cured product will improve, whereby crack resistance will be high. Especially when the thickness of the cured product is at least 5 mm or the volume of the cured product is at least 1 $cm^3$, the above effect becomes remarkable. From the viewpoint of simplicity in preparation of an evaluation sample, the thickness of the cured product is preferably at most 50 mm, and the volume is preferably at most 50 $cm^3$.

The amount of substance of ethylenically unsaturated groups in the urethane (meth) acrylate D is, per 1 g of the urethane (meth)acrylate D, from 0.1 to 3.0 mmol/g, preferably from 0.3 to 2.7 mmol/g, more preferably from 0.5 to 2.5 mmol/g. When the amount of substance is at least the lower limit value in the above range, it can be sufficiently cured. When the amount of substance is at most the upper limit value in the above range, the cured product is less likely to shrink at the time of curing the curable composition, and cracks are less likely to be formed in the cured product. Therefore, the cured product can be suitably used as an optical member.

Commercial products of the urethane (meth)acrylate D may be NK Oligo (UA-160TM, U-412A, UA-4200, UA-4400, UA-122P, etc.) manufactured by Shin-Nakamura Chemical Co., Ltd., EBECRYL (8402, 8807, 9260, etc.) manufactured by DAICEL-ALLNEX LTD., KRM (8667, 8904, etc.) manufactured by DAICEL-ALLNEX LTD., UA-306H, UA-306T, UA-3061, UA-510H manufactured by Kyoeisha Chemical Co., Ltd., UX-3204, UX-4101, UX-8101 manufactured by Nippon Kayaku Co., Ltd., etc.

As the urethane (meth)acrylate D contained in the curable compodition, one type may be used alone, or two or more types may be used in combination.

The antioxidant includes an antioxidant having a phenol moiety and an antioxidant having a sulfide moiety (excluding the above antioxidant having a phenol moiety).

The antioxidant having a phenol moiety captures radicals which are formed in a cured product and which cause coloration, thereby to suppress a decrease in transparency of the cured product. The antioxidant having a sulfide moiety can regenerate the antioxidant having a phenol moiety which has captured radicals. Thus, by using the antioxidant having a phenol moiety and the antioxidant having a sulfide moiety in combination, it is possible to suppress a decrease in transparency of the cured product over a long period of time.

Commercial products of the antioxidant having a phenol moiety may be IRGANOX (tradename) (259, 1010, 1035, 1076, 1098, 1135, etc.) manufactured by BASF Japan Ltd., and ADK STAB (tradename) (AO-50, AO-60, etc.) manufactured by ADEKA Corporation. As the antioxidant having a phenol moiety, one type may be used alone, or two or more types may be used in combination.

Commercial products of the antioxidant having a sulfide moiety may be sulfur-based antioxidant T0205 manufactured by Tokyo Chemical Industry Co., Ltd., and ADK STAB (tradename) (AO-412S, AO-503, etc.) manufactured by ADEKA Corporation. As the antioxidant having a sulfide moiety, one type may be used alone, or two or more types may be used in combination.

As the antioxidant, an antioxidant other than the antioxidant having a phenol moiety and the antioxidant having a sulfide moiety may also be used.

The total proportion of the antioxidant having a phenol moiety and the antioxidant having a sulfide moiety in the entire antioxidant is preferably at least 50 mass %, particularly preferably 100 mass %.

In the total of the antioxidant having a phenol moiety and the antioxidant having a sulfide moiety, the proportion of the antioxidant having a phenol moiety is preferably from 5 to 95 mass %, more preferably from 10 to 90 mass %, further preferably from 15 to 85 mass %.

As the antioxidant contained in the curable composition, one type may be used alone, or two or more types may be used in combination.

The organopolysiloxane contained in the curable composition of the present invention is likely to segregate to the surface of a cured product when the curable composition is cured. Accordingly, the cured product obtained by curing the curable composition of the present invention is excellent in the adhesion to an inorganic substrate or an inorganic compound layer.

The organopolysiloxane has at least one member selected from the group consisting of structural units represented by the following formula f1 (hereinafter sometimes referred to as "units f1"), structural units represented by the following formula f2 (hereinafter sometimes referred to as "units f2"), structural units represented by the following formula f3 (hereinafter sometimes referred to as "units f3") and structural units represented by the following formula f4 (hereinafter sometimes referred to as "units f4").

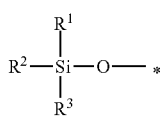

Formula f1

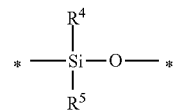

Formula f2

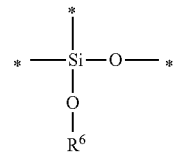

Formula f3

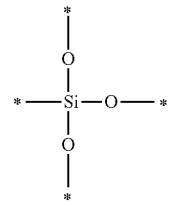

Formula f4

In the above formulae f1 to f4, $R^1$ to $R^6$ are each independently a $C_{1-6}$ alkyl group, a $C_{3-8}$ cycloalkyl group, an aryl group, a $C_{7-12}$ aralkyl group, a group having an ethylenically unsaturated group, or a hydrogen atom, and -* is a connecting bond.

The $C_{1-6}$ alkyl group may, for example, be a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group or a 1-ethyl-1-methylpropyl group.

The $C_{3-8}$ cycloalkyl group may, for example, be a cyclopropyl group, a cyclobutyl group, a cyclopentyl group or a cyclohexyl group.

The aryl group may, for example, be a phenyl group, a naphthyl group, a 2-methylphenyl group, a 3-methylphenyl group, a 4-methylphenyl group, a 4-vinylphenyl group or a 3-isopropylphenyl group.

The $C_{7-12}$ aralkyl group may, for example, be a benzyl group, a diphenylmethyl group or a naphthylmethyl group.

The group having an ethylenically unsaturated group may, for example, be $-Q^1-CR=CH_2$ or $-Q^1-O-CO-CR=CH_2$ (wherein $Q^1$ is a single bond or a $C_{1-6}$ alkylene group, and R is a hydrogen atom or a methyl group).

The $C_{1-6}$ alkylene group as $Q^1$ may, for example, be a methylene group, an ethylene group, a propylene group, an isopropylene group, a butylene group, an isobutylene group, a sec-butylene group, a tert-butylene group, a pentylene group, an isopentylene group, a neopentylene group, a tert-pentylene group, a 1-methylbutylene group, a 2-methylbutylene group, a 1,2-dimethylpropylene group, a 1-ethylpropylene group, a hexylene group, an isohexylene group, a 1-methylpentylene group, a 2-methylpentylene group, a 3-methylpentylene group, a 1,1-dimethylbutylene group, a 1,2-dimethylbutylene group, a 2,2-dimethylbutylene group, a 1-ethylbutylene group, a 1,1,2-trimethylpropylene group, a 1,2,2-trimethylpropylene group, a 1-ethyl-2-methylpropylene group or a 1-ethyl-1-methylpropylene group.

$Q^1$ is, in view of availability of the raw material, preferably a single bond or a $C_{2-4}$ alkylene group.

$R^1$ to $R^6$ are, in view of tendency of segregation to the surface, preferably a $C_{1-6}$ alkyl group, more preferably a $C_{1-3}$ alkyl group, particularly preferably a methyl group.

Among the units f1 to f4, in view of long-term stability and in view of low viscosity and handling efficiency, preferred are the units f1, f2 or f3, and more preferred are the units f1 or f2.

In view of the curability, the organopolysiloxane preferably has ethylenically unsaturated groups.

The organopolysiloxane may be linear or cyclic.

The linear organopolysiloxane is, in view of easiness of production, preferably organopolysiloxane F1 represented by the following formula F1.

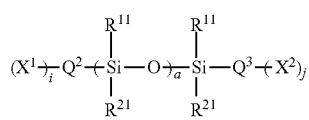

Formula F1

In the formula F1, $R^{11}$ and $R^{21}$ are each independently a $C_{1-6}$ alkyl group or a hydrogen atom. i and j are each independently from 0 to 2. $Q^2$ and $Q^3$ are each independently a $C_{1-6}$ alkyl group when i and j are 0, a single bond or a $C_{1-6}$ alkylene group when i and j are 1, and a $C_{1-6}$ trivalent hydrocarbon group when i and j are 2. $X^1$ and $X^2$ are $-CR^7=CH_2$, $-O-CO-CR^7=CH_2$ (wherein $R^7$ is a hydrogen atom or a methyl group) or $-Si(R^8)_b(OR^9)_{3-b}$ (wherein $R^8$ and $R^9$ are each independently a $C_{1-3}$ alkyl group, and b is from 0 to 3), and "a" is from 0 to 300.

The $C_{1-6}$ alkyl group as each of $R^{11}$ and $R^{21}$ may be the alkyl group exemplified as the $C_{1-6}$ alkyl group as each of $R^1$ to $R^6$. The plurality of each of $R^{11}$ and $R^{21}$ may be the same group or may be different groups. $R^{11}$ and $R^{21}$ are more preferably a $C_{1-3}$ alkyl group in view of tendency of segregation to the surface, particularly preferably a methyl group.

"a" is preferably from 0 to 100, more preferably from 0 to 50.

$R^8$ and $R^9$ may, for example, be a methyl group, an ethyl group, a propyl group or an isopropyl group.

b is preferably from 1 to 2.

$X^1$ and $X^2$ are preferably $-CR^7=CH_2$ or $-O-CO-CR^7=CH_2$, particularly preferably $-O-CO-CR^7=CH_2$.

$Q^2$ and $Q^3$ are, in view of availability of the raw material, preferably a single bond or a $C_{2-4}$ alkylene group.

Among the organopolysiloxanes F1, organopolysiloxane F11 represented by the following formula F11 is more preferred.

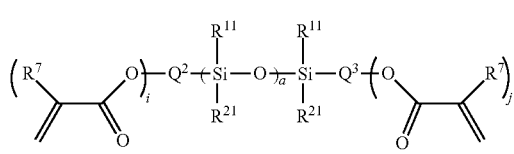

Formula F11

In the formula $F^{11}$, $R^{11}$, $R^{21}$, $Q^2$, $Q^3$, $R^7$ and "a" are the same as $R^{11}$, $R^{21}$, $Q^2$, $Q^3$, $R^7$ and "a" in the formula F1. i and j are each independently from 0 to 2. The plurality of each of $R^{11}$ and $R^{21}$ may be the same group or may be different groups. $Q^2$ and $Q^3$ may be the same group or may be different groups. The plurality of $R^7$ may be the same group or may be different groups.

The cyclic organopolysiloxane is preferably organopolysiloxane F2 represented by the following formula F2.

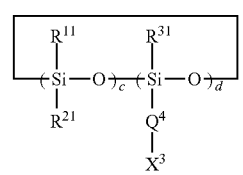

Formula F2

In the formula F2, $R^{11}$ to $R^{31}$ are the same as RH and $R^{21}$ in the formula F1. $Q^4$ is a single bond or a $C_{1-6}$ alkylene group. $X^3$ is the same as $X^1$ and $X^2$ in the formula F1. c is from 0 to 12. d is from 0 to 12. c+d is from 1 to 24.

c is preferably from 0 to 10, more preferably from 2 to 8.

d is preferably from 0 to 10, more preferably from 2 to 8.

Specific examples of the organopolysiloxane F2 include a compound represented by the following formula F21, a compound represented by the following formula F22 and a compound represented by the following formula F23. In the following formulae F21 to F23, $R^{11}$ to $R^{31}$, $Q^4$ and $X^3$ are the same as $R^{11}$ and $R^{21}$ in the formula F1, and $Q^4$ and $X^3$ in the formula F2.

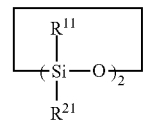

Formula F21

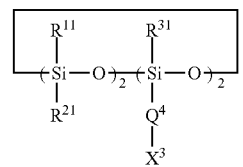

Formula F22

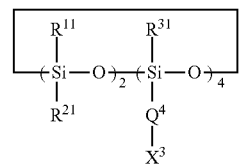

Formula F23

Mw of the organopolysiloxane is preferably from 100 to 100,000, more preferably from 120 to 75,000, further preferably from 150 to 50,000. When Mw of the organopolysiloxane is at least the lower limit value in the above range, the organopolysiloxane will segregate to the surface. When Mw of the organopolysiloxane is at most the upper limit value in the above range, the organopolysiloxane will be uniformly compatible with other components.

The organopolysiloxane may have an epoxy group.

As the organopolysiloxane contained in the curable composition, one type may be used alone, or two or more types may be used in combination.

As the radical polymerization initiator, a photoradical polymerization initiator and a thermal radical polymerization initiator may, for example, be mentioned. A photoradical polymerization initiator is preferred, whereby a cured product will easily be produced.

The photoradical polymerization initiator may be an alkyl phenone type, an acylphosphine oxide type, a titanocene type, an oxime ester type, an oxyphenylacetic acid ester type, a benzoin type, a benzophenone type, a thioxanthone type, benzyl-(o-ethoxycarbonyl)-α-monooxime, glyoxy ester, 3-ketocoumarin, 2-ethyl anthraquinone, camphorquinone, tetramethylthiuram sulfide, azobisisobutyronitrile, benzoyl peroxide, a dialkyl peroxide, tert-butyl peroxypivalate or the like. From the viewpoint of sensitivity and compatibility, an alkyl phenone type, an acylphosphine oxide type, a benzoin type or a benzophenone type is preferred.

The thermal radical polymerization initiator may be 2,2'-azobisisobutyronitrile, benzoyl peroxide, tert-butyl hydroperoxide, cumene hydroperoxide, di-tert-butyl peroxide, dicumyl peroxide or the like. From the viewpoint of the decomposition temperature, 2,2'-azobisisobutyronitrile or benzoyl peroxide is preferred.

As the radical polymerization initiator contained in the curable composition, one type may be used alone, or two or more types may be used in combination.

The curable composition of the present invention may contain additives such as a surfactant, a thixotropic agent, an antifoaming agent, a light stabilizer, an anti-gelling agent, a photosensitizer, a resin, a resin oligomer, a carbon compound, metallic fine particles, metal oxide particles (excluding the metal oxide fine particles A), a silane coupling agent, other organic compounds, etc.

The curable composition of the present invention may contain a solvent. However, prior to curing the curable composition, it is preferred to remove the solvent.

As the solvent, any may be used so long as it is a solvent capable of dissolving the (meth)acrylate B, the organopolysiloxane, the epoxy (meth)acrylate C, the urethane (meth) acrylate D, the antioxidant and the radical polymerization initiator. Among them, preferred is a solvent having at least one of an ester structure, a ketone structure, a hydroxy group, an aromatic hydrocarbon group and an ether structure. The solvent is preferably 1-methoxy-2-propanol, propylene glycol monomethyl ether acetate, methyl ethyl ketone, methyl isobutyl ketone, 2-propanol or toluene, particularly preferably methyl ethyl ketone, 2-propanol or toluene.

In the case of using a solvent in the present invention, the content of the solvent in the curable composition may be suitably adjusted depending on the desired viscosity, coating properties, desired thickness, etc.

The proportion of the metal oxide fine particles A in the curable composition is preferably from 3 to 55 mass %, more preferably from 5 to 51 mass %, further preferably from 15 to 50 mass %, particularly preferably from 17 to 40 mass %, most preferably from 15 to 25 mass %, to the total mass of the metal oxide fine particles A, the (meth)acrylate B, the organopolysiloxane, the epoxy (meth)acrylate C and the urethane (meth)acrylate D. When the proportion of the metal oxide fine particles A is at least the lower limit value in the above range, the Abbe number of the cured product will be high. When the proportion of the metal oxide fine particles A is at most the upper limit value in the above range, the compatibility with other components will be good, the metal oxide fine particles A tend to be uniformly dispersed in the curable composition, and the cured product will be excellent in transparency. Further, the cured product is less likely to become brittle, and cracks are less likely to be formed in the cured product.

The proportion of the (meth)acrylate B in the curable composition is preferably from 3 to 70 mass %, more preferably from 5 to 66 mass %, further preferably from 20 to 65 mass %, particularly preferably from 40 to 55 mass %, most preferably from 45 to 50 mass %, to the total mass of the metal oxide fine particles A, the (meth)acrylate B, the organopolysiloxane, the epoxy (meth)acrylate C and the urethane (meth)acrylate D. When the proportion of the (meth)acrylate B is at least the lower limit value in the above range, curability of the curable composition will be good. When the proportion of the (meth)acrylate B is at most the upper limit value in the above range, the Abbe number of the cured product will be high.

The proportion of the organopolysiloxane in the curable composition is preferably from 3 to 60 mass %, more preferably from 5 to 55 mass %, further preferably from 10 to 50 mass %, particularly preferably from 15 to 45 mass %, most preferably from 20 to 40 mass %, to the total mass of the metal oxide fine particles A, the (meth)acrylate B, the organopolysiloxane, the epoxy (meth)acrylate C and the urethane (meth)acrylate D. When the proportion of the organopolysiloxane is at least the lower limit value in the above range, adhesion to the inorganic substrate or the inorganic compound layer will be excellent. When the proportion of the organopolysiloxane is at most the upper limit value in the above range, properties of the other components will not be impaired.

The epoxy (meth)acrylate C is contained in the curable composition of the present invention as the case requires.

The proportion of the epoxy (meth)acrylate C in the curable composition is preferably from 0 to 80 mass %, more preferably from 10 to 65 mass %, further preferably from 20 to 50 mass %, particularly preferably from 22 to 46 mass %, most preferably from 24 to 42 mass %, to the total mass of the metal oxide fine particles A, the (meth)acrylate B, the organopolysiloxane, the epoxy (meth)acrylate C and the urethane (meth)acrylate D. When the proportion of the epoxy (meth)acrylate C is at least the lower limit value in the above range, compatibility with other components will be good, and the cured product will be excellent in transparency. When the proportion of the epoxy (meth)acrylate C is at most the upper limit value in the above range, the Abbe number of the cured product will be high.

The urethane (meth)acrylate D is contained in the curable composition of the present invention as the case requires.

The proportion of the urethane (meth)acrylate D in the curable composition is preferably from 0 to 40 mass %, more preferably from 3 to 36 mass %, further preferably from 5 to 32 mass %, to the total mass of the metal oxide fine particles A, the (meth)acrylate B, the organopolysiloxane, the epoxy (meth)acrylate C and the urethane (meth)acrylate D. When the proportion of the urethane (meth)acrylate D is at least the lower limit value in the above range, it is possible to improve the flexibility of the cured product, whereby crack resistance will be high. When the proportion of the urethane (meth)acrylate D is at most the upper limit value in the above range, the Abbe number of the cured product will be high.

The proportion of the antioxidant in the curable composition is preferably from 0.1 to 10 parts by mass, more preferably from 0.5 to 8 parts by mass, further preferably from 1 to 6 parts by mass, to 100 parts by mass of the total mass of the metal oxide fine particles A, the (meth)acrylate B, the organopolysiloxane, the epoxy (meth)acrylate C and the urethane (meth)acrylate D. When proportion of the antioxidant is at least the lower limit value in the above range, it is possible to suppress a decrease in transparency of the cured product over a long period of time. When the proportion of the antioxidant is at most the upper limit value in the above range, it is possible to prevent deterioration of curability of the cured product.

The proportion of the radical polymerization initiator in the curable composition is preferably from 0.1 to 10 parts by mass, more preferably from 0.2 to 7 parts by mass, further preferably from 0.5 to 5 parts by mass, to 100 parts by mass of the total mass of the metal oxide fine particles A, the (meth)acrylate B, the organopolysiloxane, the epoxy (meth) acrylate C and the urethane (meth)acrylate D. When the proportion of the radical polymerization initiator is at least the lower limit value in the above range, it is possible to easily form a cured product. When the proportion of the radical polymerization initiator is at most the upper limit value in the above range, since the radical polymerization initiator can be uniformly mixed, the radical polymerization initiator remaining in the cured product will be less, whereby deterioration of physical properties of the cured product can be suppressed.

The total amount of other components such as additives is preferably at most 5 parts by mass, more preferably at most 3 parts by mass, to 100 parts by mass of the total mass of the metal oxide fine particles A, the (meth)acrylate B, the organopolysiloxane, the epoxy (meth)acrylate C and the urethane (meth)acrylate D.

In a case where the curable composition of the present invention contains the epoxy (meth)acrylate C and contains no urethane (meth)acrylate D, the basis for calculation of the proportions of the respective components is substantially the total of the metal oxide fine particles A, the (meth)acrylate B, the organopolysiloxane and the epoxy (meth)acrylate C, since the proportion of the urethane (meth)acrylate D is 0 mass %.

In a case where the curable composition of the present invention contains the urethane (meth)acrylate D and contains no epoxy (meth)acrylate C, the basis for calculation of the proportions of the respective components is substantially the total of the metal oxide fine particles A, the (meth) acrylate B, the organopolysiloxane and the urethane (meth) acrylate D, since the proportion of the epoxy (meth)acrylate C is 0 mass %.

In a case where the curable composition of the present invention contains neither of the epoxy (meth)acrylate C and the urethane (meth)acrylate D, the basis for calculation of the proportions of the respective components is substantially the total of the metal oxide fine particles A, the (meth) acrylate B and the organopolysiloxane.

[Cured Product]

The cured product of the present invention is a cured product formed by curing the curable composition of the present invention, and contains a matrix resin having an alicyclic condensed ring, and metal oxide fine particles dispersed in the matrix resin.

The matrix resin is, for example, constituted by cured components other than the metal oxide fine particles A, such as the (meth)acrylate B, the epoxy (meth)acrylate C, the urethane (meth)acrylate D and the organopolysiloxane, in the curable composition of the present invention.

The proportion of the metal oxide fine particles in the cured product is preferably from 3 to 55 mass %, more preferably from 5 to 51 mass %, further preferably from 15 to 50 masa %, to the total of the matrix resin and the metal oxide fine particles. When the proportion of the metal oxide fine particles is at least the lower limit value in the above range, the cured product hardly undergoes denaturation such as oxidative degradation or changes of shape even in a high temperature/high humidity environment. When the proportion of the metal oxide fine particles is at most the upper limit value in the above range, the cured product will be excellent in transparency. Further, the cured product is less likely to become brittle, and cracks are less likely to be formed in the cured product.

The proportion of the matrix resin in the cured product is preferably from 45 to 97 mass %, more preferably from 49 to 95 mass %, further preferably from 50 to 85 mass %, to the total of the matrix resin and the metal oxide fine particles.

The thickness of the cured product is not particularly limited and may, for example, be from 0.05 to 10.0 mm.

The method for forming a cured product may be a method in which the curable composition is cured in such a state that the curable composition is in contact with a mold having a reverse pattern of a fine pattern on its surface, to form the cured product having the fine pattern on its surface (imprinting method). Otherwise, a method in which the curable composition is injected into a mold cavity, and the curable composition is cured to form a cured product (cast molding method) may also be employed.

The curing method may be photocuring or thermosetting, and may be suitably selected depending on the polymerization initiator. As the curing method, in view of efficiency for the production of a cured product, photocuring is preferred.

The transmittance of light having a wavelength of 400 nm per 1 mm in thickness of the cured product formed by curing the curable composition of the present invention is preferably at least 30%, more preferably at least 50%, further preferably at least 88%, still more preferably at least 90%. When the transmittance is at least the above lower limit value, the cured product will be further excellent in transparency.

The transmittance of light having a wavelength of 400 nm per 1 mm in thickness of the cured product is obtained from the following formula 1:

$$T = T_1 \times (1-r)^2 \qquad \text{Formula 1}$$

Here, T is the transmittance of light having a wavelength of 400 nm per 1 mm in thickness of the cured product, $r = \{(n-1)/(n+1)\}^2$, $T_1$ is the internal transmittance of light having a wavelength of 400 nm per 1 mm in thickness of the cured product, and is obtained from the following formula 2, n is the refractive index to light having a wavelength of 400 nm at 25° C. of the cured product.

$$= (T_Y/100)^{1/Y} \times 100 \qquad \text{Formula 2}$$

Here, $T_Y$ is the internal transmittance of light having a wavelength of 400 nm per Y mm in thickness of the cured product, and is obtained from the following formula 3.

$$T_Y = (\text{Transmittance of light having a wavelength of } 400 \text{ nm per } Y \text{ mm in thickness of the cured product})/(1-r)^2 \qquad \text{Formula 3}$$

The internal transmittance of light having a wavelength of 400 nm per 1 mm in thickness of the cured product as calculated from the formula 2 and the formula 3, is preferably at least 50%, more preferably at least 90%, further preferably at least 95%, still more preferably at least 97%. When said internal transmittance is at least the lower limit value in the above range, the cured product will be particularly excellent in transparency. Said internal transmittance should better be higher, and the upper limit is 100%.

After being held in an atmosphere at a temperature of 85° C. under a relative humidity of 85% for 1,000 hours, the internal transmittance of light having a wavelength of 400 nm per 1 mm in thickness of the cured product is preferably at least 50%, more preferably at least 90%, further preferably at least 95%, still more preferably at least 96%. When said internal transmittance is at least the lower limit value in the above range, it is possible to suppress a decrease in transparency of the cured product over a long period of time.

In accordance with the following formula 4, the retention of the internal transmittance of light having a wavelength of 400 nm per 1 mm in thickness of the cured product after a moisture and heat resistance test is calculated.

The retention of the internal transmittance (%)=(the internal transmittance of light having a wavelength of 400 nm per 1 mm in thickness of the cured product after a moisture and heat resistance test/the internal transmittance of light having a wavelength of 400 nm per 1 mm in thickness of the cured product before a moisture and heat resistance test)×100   Formula 4

The retention of the internal transmittance after a heat and moisture resistance test is preferably at least 95%, more preferably at least 97%, further preferably at least 99%. When the retention of the internal transmittance is at least the lower limit value in the above range, it is possible to suppress a decrease in transparency of the cured product over a long period of time.

As described above, the curable composition of the present invention contains as essential components the metal oxide fine particles A, the (meth)acrylate B, the specific antioxidant, the organopolysiloxane and the radical polymerization initiator. Since the curable composition of the present invention contains the (meth)acrylate B and the radical polymerization initiator and is cured by radical polymerization, it is excellent in curability, and a cured product formed by curing it is excellent in heat resistance. Further, since the curable composition of the present invention contains the organopolysiloxane, a cured product formed by curing it is excellent in adhesion to an inorganic substrate or an inorganic compound layer. Accordingly, even when exposed to a high temperature/high humidity environment for a long period of time, peeling is less likely to occur between the cured product and the inorganic substrate or between the cured product and the inorganic compound layer.

Further, since the curable composition of the present invention comprises the metal oxide fine particles A, the (meth)acrylate B and the specific antioxidant and as the case requires, the epoxy (meth)acrylate C and the urethane (meth)acrylate D, the formed cured product will be excellent also in transparency.

[Laminate]

The laminate of the present invention comprises a cured product formed by curing the curable composition of the present invention and an inorganic compound layer formed on the cured product. The laminate of the present invention may, for example, be a laminate comprising an inorganic substrate, a cured product formed by curing the curable composition of the present invention on the surface of the inorganic substrate, and an inorganic compound layer formed on the opposite side of the inorganic substrate from the cured product.

The inorganic substrate may, for example, be a substrate made of an inorganic material such as glass, quartz glass or a metal. The inorganic substrate may be a planar substrate or may be a curved substrate.

The thickness of the inorganic substrate is not particularly limited and may, for example, be from 0.025 to 5.0 mm.

The glass transition temperature of the cured product is preferably from 90 to 350° C., more preferably from 100 to 350° C., further preferably from 150 to 350° C., particularly preferably from 200 to 350° C. When the glass transition temperature of the cured product is at least the lower limit value, the cured product is less likely to be softened in a high temperature/high humidity environment. When the glass transition temperature of the cured product is at most the upper limit value, the curable composition of the present invention will be easily available.

The refractive index to light having a wavelength of 589 nm of the cured product is preferably at least 1.45, more preferably from 1.48 to 1.53. When the refractive index is within the above range, even when the cured product is combined with another member such as a glass substrate, Fresnel reflection is less likely to occur, and loss of the transmittance will be less.

The Abbe number obtained from the following formula 5 of the cured product is preferably at least 54, more preferably at least 56, further preferably at least 58. When the Abbe number is at least the lower limit value in the above range, the chromatic aberration is less likely to occur. The Abbe number should better be higher, and the upper limit is not particularly limited, but is about 70 in consideration of being an organic substance.

$$v_D=(n_D-1)/(n_F-n_C)$$   Formula 5

Here, $v_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

The thickness of the cured product in the laminate is not particularly limited and may, for example, be from 0.05 to 10.0 mm.

The method for forming the cured product may be a method in which the curable composition is cured in such a state that the curable composition is in contact with a mold having a reverse pattern of a fine pattern on its surface, to form a cured product having the fine pattern on its surface (imprinting method). Otherwise, a method in which the curable composition is injected into a mold cavity, and the curable composition is cured to form a cured product (cast molding method) may also be employed.

The curing method may be photocuring or thermosetting, and may be suitably selected depending on the polymerization initiator. As the curing method, from the viewpoint of efficiency for the production of a cured product, photocuring is preferred.

The inorganic compound forming the inorganic compound layer may, for example, be a metal compound. The metal spices species of the metal compound may, for example, be Si, Zn, Zr, Ti, Ta, Nb, In, Sn, Y, W, Al, Cr or Ga. With a view to controlling optical properties, the metal species of the metal compound is preferably at least one member selected from the group consisting of Si, Zn, Zr, Ti, Ta, Nb, In, Sn, Y, W, Al, Cr and Ga, more preferably Si, Ti, Ta or Nb.

The inorganic compound forming the inorganic compound layer may, for example, be $SiO_2$, SiC, ZnO, $ZrO_2$, $TiO_2$, $Ta_2O_5$, $Nb_2O_5$, $In_2O_3$, $SnO_2$, $Y_2O_3$, $WO_3$, $Al_2O_3$, TiC, TiN, $Cr_2O_3$ and $Ga_2O_3$. With a view to controlling optical properties, it is preferably at least one member selected from the group consisting of $SiO_2$, SiC, ZnO, $ZrO_2$, $TiO_2$, $Ta_2O_5$, $Nb_2O_5$, $In_2O_3$, $SnO_2$, $Y_2O_3$, $WO_3$, $Al_2O_3$, TiC, TiN, $Cr_2O_3$ and $Ga_2O_3$, more preferably $SiO_2$, $TiO_2$, $Ta_2O_5$ or $Nb_2O_5$.

The inorganic compound layer may, for example, be a vapor deposited layer of a metal compound.

The thickness of the inorganic compound layer is not particularly limited and may, for example, be from 10 to 5,000 nm.

As a method of forming the inorganic compound layer, a vacuum deposition method or a sputtering method may, for example, be mentioned.

Since the above-described laminate of the present invention comprises a cured product formed by curing the curable composition of the present invention, is excellent in heat resistance, and the cured product is excellent in adhesion to the inorganic substrate and the inorganic compound layer, peeling is less likely to occur even when exposed in a high temperature/high humidity environment for a long period of time.

EXAMPLES

Now, the present invention will be described in further detail with reference to Examples, but it should be understood that the present invention is by no means restricted thereto. Ex. 1 to 5 are Examples of the present invention, and Ex. 6 and 7 are Comparative Examples.

[Evaluation Method]

(Median Diameter of Metal Oxide Fine Particles)

Obtained by using a particle size distribution measuring apparatus (manufactured by Otsuka Electronics Co., Ltd., FPAR1000) by a dynamic light scattering method.

(Preparation of Evaluation Sample I)

A (meth)acrylate or a curable composition was applied to the surface of a quartz glass substrate having release-treated. A slide glass substrate having release-treated and the quartz glass substrate were disposed to face each other via a spacer having a thickness of 100 μm so that the curable composition was sandwiched between the substrates. In such a state, the curable composition was irradiated with ultraviolet rays from a high pressure mercury lamp at an exposure amount of 3,000 mJ/cm². The release-treated quartz glass substrate was peeled, and the surface of the cured product was washed with ethanol and dried and subjected to heat treatment at 180° C. for 15 minutes. The slide glass substrate was peeled to obtain evaluation sample I (cured product) having a thickness of 100 μm.

(Glass Transition Temperature)

Using a differential scanning calorimeter (manufactured by TA Instruments Inc., DSC-Q20), the evaluation sample I was heated at a rate of 20° C./min from 10° C. to 350° C. in a nitrogen atmosphere, to obtain the glass transition temperature. With respect to one, of which the glass transition temperature was not observed at 350° C., the glass transition temperature was assumed to be at least 350° C.

(Amount of Substance of Ethylenically Unsaturated Groups)

Using a FT-NMR apparatus (manufactured by JEOL Ltd., JNM-AL300), the 1H-NMR spectrum of the epoxy acrylate or the curable composition was measured (300 MHz, solvent: $CDCl_3$, reference: tetramethylsilane). Using 1,4-bis(trifluorobenzene) as an internal standard, the amount of substance of ethylenically unsaturated groups in the vicinity of 6 ppm was calculated.

(Refractive Index of Curable Composition)

Measured at a temperature of 25° C. at a wavelength of 589 nm by using an Abbe refractometer (manufactured by ATAGO CO., LTD., Multiwavelength Abbe refractometer DR-M2).

(Abbe Number of Curable Composition)

Calculated from the above formula 5 by measuring the refractive indexes at wavelengths of 589 nm, 486 nm and 656 nm, at a temperature of 25° C., by using the Abbe refractometer (as mentioned above).

(Curability)

With respect to a curable composition, using a viscoelasticity measuring apparatus (tradename "MCR301", manufactured by Anton Paar Japan K.K.) and an ultraviolet irradiation apparatus (tradename "LC8", manufactured by Hamamatsu Photonics K.K.), the viscoelasticity behavior when irradiated with UV was measured to evaluate the reaction rate (curability). Specifically, taking a point when the storage elastic modulus reached $1 \times 10^4$ Pa as an index of the gelation point, the time after UV irradiation (the time (sec) from initiation of UV irradiation to the point when the storage elastic modulus reached $1 \times 10^4$ Pa) was measured. Analysis conditions of the viscoelasticity measuring apparatus were as follows.

Measurement mode: vibration mode
Measurement plate shape: parallel (12 mm in diameter)
Measurement temperature: 25° C.
Measurement frequency: 1 Hz
Measurement distortion: 0.1%

(Preparation of Evaluation Samples II, III)

A curable composition was applied to the surface of a quartz glass substrate having release-treated. A slide glass substrate not having release-treated and the release-treated quartz glass substrate were disposed to face each other via a spacer having a thickness of 1 mm so that the curable composition was sandwiched between the substrates. In such a state, the curable composition was irradiated with ultraviolet rays from a high pressure mercury lamp at an exposure amount of 3,000 mJ/cm². The release-treated quartz glass substrate was peeled, the surface of the cured product was washed with ethanol and dried and subjected to heat treatment at 180° C. for 15 minutes to obtain evaluation sample II having a cured product having a thickness of 1 mm formed on the surface of the slide glass substrate.

Evaluation sample III was prepared in the same manner as in the preparation of the evaluation sample II except that a slide glass substrate having primer-treated was used instead of the slide glass substrate not having release-treated.

(Preparation of Evaluation Sample IV)

On the cured product of the evaluation sample II or III, a metal oxide ($SiO_2$, $TiO_2$, $Nb_2O_5$, $Ta_2O_5$ or $ZrO_2$) was film-formed by sputtering under a sputtering gas pressure of 0.30 Pa, in an $Ar:O_2$ flow rate ratio of 1:9 at a deposition chamber temperature of 30° C. to form an inorganic compound layer having a film thickness of 200 nm.

(Refractive Index of Cured Product)

Using a refractive index measuring device (manufactured by US Metricon, prism coupler: 2010/M), the refractive indexes to lights having wavelengths of 473 nm, 594 nm and 658 nm of the cured product having a thickness of 100 μm of the evaluation sample I were measured at a temperature of 25° C., and using Metricon Fit attached to the device, the refractive index to light having a wavelength of 589 nm was calculated.

(Abbe Number of Cured Product)

The Abbe number was calculated from the above formula 5 by calculating the refractive indexes of the cured product for evaluation at the respective wavelengths by using Metricon Fit attached to the above-mentioned refractive index measuring device.

(Humidity and Heat Resistance Test)

The evaluation samples II, III and IV were held in an atmosphere at a temperature of 85° C. under a relative humidity of 85% for 1,000 hours.

(Measurement of Transmittance)

With respect to cured products of the evaluation samples II and III before and after the humidity and heat resistance test, the transmittance to light having a wavelength of 400 nm was measured using an ultraviolet/visible/near infrared spectrophotometer (manufactured by Shimadzu Corporation, Solid Spec-3700).

(Adhesion of Cured Product and Inorganic Compound Layer)

The adhesive tape as defined in JIS Z1522 was bonded on the inorganic compound layer of the evaluation sample IV after the humidity and heat resistance test and then peeled. Then, the outer appearance of the inorganic compound layer side was visually observed and peeling of the inorganic compound layer was confirmed, and the adhesion to the inorganic compound layer was evaluated based on the following standards.

O: No peeling occurred at all.

Δ: Peeling partially occurred.

X: The inorganic compound layer completely peeled.

[Raw Materials]

Raw materials used in Examples are shown below.

(Metal Oxide Fine Particles a Dispersion)

Metal oxide fine particles A-1 dispersion: ORGANOSILICASOL (manufactured by Nissan Chemical Corporation, MEK-ST-40, dispersion medium: methyl ethyl ketone, $SiO_2$ concentration: 40 mass %, particle shape: spherical, particle size (median diameter): 10 nm, organic component of fine particles: 3 mass %).

Metal oxide fine particles A-2 dispersion: ORGANOSILICASOL (manufactured by Nissan Chemical Corporation, TOL-ST, dispersion medium: toluene, $SiO_2$ concentration: 40 mass %, particle shape: spherical, particle size (median diameter): 10 nm, organic component of fine particles: 5 mass %).

Metal oxide fine particles A-3 dispersion: surface modified zirconia particles dispersion (manufactured by pixelligent, tradename: PCPR-50-ETA, dispersion medium: ethyl acetate, $ZrO_2$ concentration: 50 mass %, particle size (median diameter): 10 nm, organic component of fine particles: 17 mass %).

Metal oxide fine particles A-4 dispersion: titania sol (manufactured by catalyst and chemical, tradename: Optolake 6320z (11 RU-7•MK), dispersion medium: propylene glycol monomethyl ether acetate, $TiO_2$ concentration: 20 mass %, particle size (median diameter): 13 nm, organic component of fine particles: 8 mass %).

((Meth)acrylate B)

Acrylate B-1: dicyclopentanyl acrylate (compound represented by the following formula B-1, manufactured by Tokyo Chemical Industry Co., Ltd., glass transition temperature of the homopolymer: 120° C.).

Acrylate B-2: isobornyl acrylate (compound represented by the following formula B-2, manufactured by Tokyo Chemical Industry Co., Ltd., glass transition temperature of the homopolymer: 90° C.).

Methacrylate B-3: 1-adamantyl methacrylate (compound represented by the following formula B-3, manufactured by Osaka Organic Chemical Industry Ltd., ADMA, glass transition temperature of the homopolymer: 250° C.).

Formula B-1

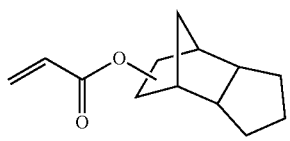

Formula B-2

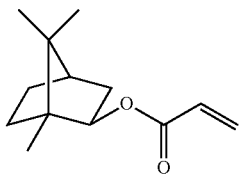

Formula B-3

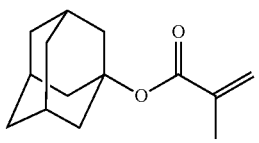

(Epoxy (meth)acrylate C)

Epoxy acrylate C-1: epoxy acrylate (manufactured by Shin-Nakamura Chemical Co., Ltd., NK Oligo EA-5311, compound obtained by adding acrylic acid to a reaction product of trimethylolpropane and epichlorohydrin, amount of substance of ethylenically unsaturated groups: 2.8 mmol/g).

Epoxy acrylate C-2: epoxy acrylate (manufactured by Shin-Nakamura Chemical Co., Ltd., NK Oligo EA-5511, compound obtained by adding acrylic acid to glycidyl ether, amount of substance of ethylenically unsaturated groups: 1.5 mmol/g).

(Urethane (meth)acrylate D)

Urethane acrylate D-1: urethane acrylate (manufactured by Shin-Nakamura Chemical Co., Ltd., UA-4200, mass average molecular weight: 1,300, amount of substance of ethylenically unsaturated groups: 1.5 mmol/g).

(Antioxidant)

Antioxidant E-1: tetrakis[methylene-3-(3,5-di-tert-butyl-4-hydroxyphenyl) propionate] methane (compound represented by the following formula E-1, manufactured by BASF Japan Ltd., IRGANOX (tradename) 1010).

Antioxidant E-2: 2,2'-thio-diethyl-bis(3-(3,5-di-tert-butyl-4-hydroxyphenyl) propionate (compound represented by the following formula E-2, manufactured by BASF Japan Ltd., IRGANOX (tradename) 1035).

Antioxidant E-3: 3,3'-thiodipropionic acid didodecyl (compound represented by the following formula E-3, manufactured by Tokyo Chemical Industry Co., Ltd.).

Antioxidant E-4: 2,2'-methylenebis(4,6-di-t-butylphenyl) octyl phosphite (compound represented by the following formula E-4, manufactured by ADEKA Corporation, (tradename) HP-10).

Formula E-1

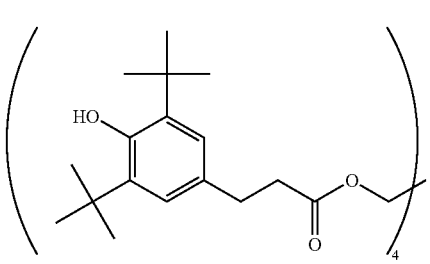

-continued

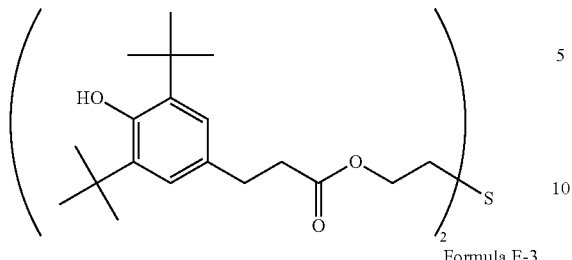

Formula E-2

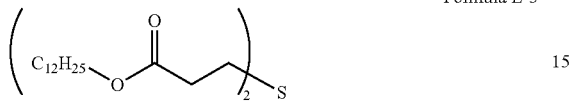

Formula E-3

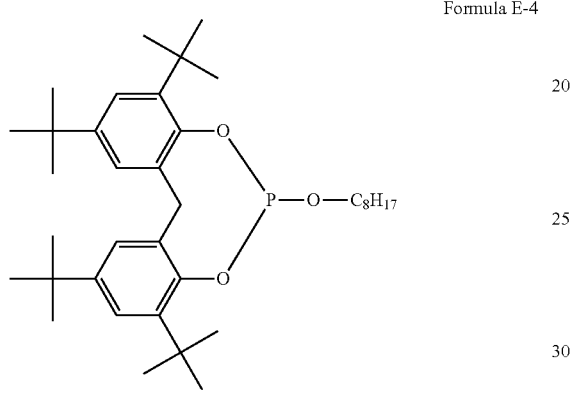

Formula E-4

(Organopolysiloxane)

Organopolysiloxane F-1: organopolysiloxane (compound represented by the following formula F-1, manufactured by Shin-Etsu Chemical Co., Ltd., X-22-164AS).

Organopolysiloxane F-2: cyclic siloxane (manufactured by Shin-Etsu Chemical Co., Ltd., (tradename) X-40-2670).

Organopolysiloxane F-3: a mixture of polyether-modified polydimethyl siloxane and polyether (manufactured by BYK Japan KK, tradename: BYK-307).

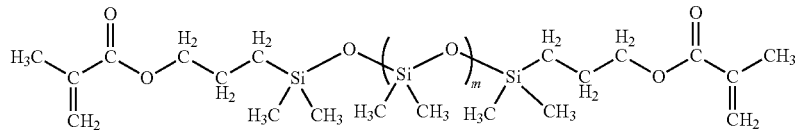

Formula F-1

(Epoxy Compound)

Epoxy compound I-1: compound prepared by the method disclosed in paragraph [0138], Preparation Example 1, of JP-A-2018-008518, (3,4,3',4'-diepoxy)bicyclohexyl.

Epoxy compound I-2: non-ester hydrogenated bisphenol type digylcidyl compound (manufactured by Mitsubishi Chemical Corporation, YX8000).

(Radical Polymerization Initiator)

Radical polymerization initiator G-1: 2-hydroxy-2-methyl propiophenone (manufactured by BASF Japan Ltd., Irgacure (tradename) 1173).

Radical polymerization initiator G-2: 2,4,6-trimethylbenzoyl-diphenyl-phosphine oxide (manufactured by BASF Japan Ltd., Irgacure (tradename) TPO).

(Cationic Polymerization Initiator)

Cationic polymerization initiator H-1: 4-(phenylthio)phenyldiphenyl sulfonium hexafluoroantimonate (manufactured by San-Apro Ltd., tradename: CPI-101A).

Ex. 1 to 7

So that the proportions of solid contents became to be the proportions as shown in Table 1, the metal oxide fine particles A dispersion, the (meth)acrylate B, the organopolysiloxane, the epoxy (meth)acrylate C and the urethane (meth)acrylate D were mixed so as to be uniform by using, as a solvent, methyl ethyl ketone, toluene, ethyl acetate or propylene glycol monomethyl ether acetate, alone or in combination of two or more, and the solvent was evaporated under reduced pressure at 40° C. To the obtained mixture, the antioxidant and the radical polymerization initiator were added in amounts as shown in Table 1 to obtain a curable composition.

Evaluation results are shown in Tables 2 and 3.

TABLE 1

| Blend [parts by mass] | | Ex. 1 | Ex. 2 | Ex. 3 | Ex. 4 | Ex. 5 | Ex. 6 | Ex. 7 |
|---|---|---|---|---|---|---|---|---|
| Metal oxide fine particles A | A-1 | | 20 | | | | | |
| | A-2 | 55 | | 5 | | | 55 | |
| | A-3 | | | | 5 | | | |
| | A-4 | | | | | 3 | | |
| (Meth)acrylate B | B-1 | | 40 | | 60 | | | |
| | B-2 | 20 | | 50 | | | 20 | |
| | B-3 | | | | | 5 | | |
| Epoxy (meth)acrylate C | C-1 | 4 | | | 10 | 55 | 5 | |
| | C-2 | | 25 | 40 | | | | |
| Urethane (meth)acrylate D | D-1 | 16 | | | | | 20 | |
| Antioxidant | E-1 | 1 | 1 | 1 | 1 | 1 | 1 | 1 |
| | E-2 | 1 | 1 | 1 | 1 | 1 | 1 | |
| | E-3 | 2 | 2 | 2 | 2 | 2 | 2 | |
| | E-4 | | | | | | | 1 |
| Organopolysiloxane | F-1 | 5 | 15 | 5 | 25 | 37 | | |
| | F-2 | | | | | | 25 | |
| | F-3 | | | | | | 0.5 | |
| Epoxy compound | I-1 | | | | | | | 40 |
| | I-2 | | | | | | | 35 |
| Radical polymerization initiator | G-1 | | 0.5 | | 0.5 | | | |
| | G-2 | 0.5 | | 0.5 | | 0.5 | 0.5 | |
| Cationic polymerization initiator | H-1 | | | | | | | 0.45 |

TABLE 2

| | Ex. 1 | Ex. 2 | Ex. 3 | Ex. 4 | Ex. 5 | Ex. 6 | Ex. 7 |
|---|---|---|---|---|---|---|---|
| Amount of substance of ethylenically unsaturated groups in curable composition [mmol/g] | 1.55 | 2.65 | 3.11 | 3.76 | 2.62 | 1.52 | — |
| Refractive index $n_D$ of curable composition | 1.471 | 1.480 | 1.473 | 1.508 | 1.500 | 1.471 | 1.500 |
| Refractive index $n_D$ of cured product | 1.500 | 1.510 | 1.503 | 1.538 | 1.530 | 1.498 | 1.520 |
| Abbe number $v_D$ of curable composition | 58.9 | 57.4 | 55.8 | 53.2 | 52.8 | 59.0 | 56.3 |
| Abbe number $v_D$ of cured product | 58.0 | 58.0 | 56.1 | 54.7 | 53.0 | 58.4 | 56.0 |
| Curability (time until $10 \times 10^4$ Pa was reached) [sec] | 1.0 | 0.5 | 0.5 | 0.5 | 0.5 | 1.0 | 30 |
| Glass transition temperature [° C.] of cured product | ≥350 | ≥350 | 182 | ≥350 | 183 | ≥350 | 159 |
| Transmittance (wavelength: 400 nm) [%] per 1 mm in thickness of cured product before humidity and heat resistance test | 89.0 | 89.7 | 90.8 | 88.6 | 52.1 | 89.2 | 88.7 |
| Transmittance (wavelength: 400 nm) [%] per 1 mm in thickness of cured product after humidity and heat resistance test | 87.7 | 87.5 | 89.1 | 87.1 | 51.8 | 88.3 | 83.4 |
| Internal transmittance (wavelength: 400 nm) [%] per 1 mm in thickness of cured product before humidity and heat resistance test | 96.6 | 97.6 | 98.6 | 97.1 | 57.0 | 96.7 | 96.6 |
| Internal transmittance (wavelength: 400 nm) [%] per 1 mm in thickness of cured product after humidity and heat resistance test | 95.2 | 95.2 | 96.8 | 95.5 | 56.7 | 95.8 | 90.9 |
| Retention of internal transmittance (wavelength: 400 nm) [%] per 1 mm in thickness | 98.5 | 97.5 | 98.1 | 98.3 | 99.4 | 99 | 94.1 |

TABLE 3

| | | Ex. 1 | Ex. 2 | Ex. 3 | Ex. 4 | Ex. 5 | Ex. 6 | Ex. 7 |
|---|---|---|---|---|---|---|---|---|
| Adhesion of cured product and inorganic compound layer | Inorganic compound: $SiO_2$ | ○ | — | — | ○ | — | x | ○ |
| | Inorganic compound: $TiO_2$ | ○ | — | — | — | ○ | x | x |
| | Inorganic compound: $Nb_2O_5$ | — | ○ | — | ○ | — | — | — |
| | Inorganic compound: $Ta_2O_5$ | — | — | ○ | — | ○ | — | — |
| | Inorganic compound: $ZrO_2$ | — | — | — | ○ | — | — | x |

As shown in Tables 2 and 3, the curable composition in each of Ex. 1 to 5 comprising the metal oxide fine particles A, the (meth)acrylate B, the antioxidant, the organopolysiloxane and the radical polymerization initiator was excellent in curability. Further, the cured product after the humidity and heat resistance test was excellent in adhesion to the inorganic compound layer, and a change in the transmittance of the cured product between before and after the humidity and heat resistance test was small.

On the other hand, the cured product of the curable composition in Ex. 6 containing no organopolysiloxane was inferior in the adhesion to the inorganic compound layer. The curable composition in Ex. 7 containing no (meth)acrylate B was inferior in the curability, and its cured product was inferior in the humidity and heat resistance.

The entire disclosures of Japanese Patent Application No. 2019-025668 filed on Feb. 15, 2019 and Japanese Patent Application No. 2019-227662 filed on Dec. 17, 2019 including specifications, claims and summaries are incorporated herein by reference in their entireties.

What is claimed is:

1. A curable composition comprising:
   metal oxide fine particles A which have no aromatic ring and which have a median diameter of from 5 to 20 nm;
   a (meth)acrylate B which has an alicyclic condensed ring, and of which the glass transition temperature of the homopolymer is from 90 to 350° C., excluding an organopolysiloxane;
   an antioxidant;
   an organopolysiloxane;
   a radical polymerization, initiator;
   an epoxy (meth)acrylate C which has no aromatic ring, and in which the amount of substance of ethylenically unsaturated groups is from 0.1 to 3.0 mmol/g, excluding an organopolysiloxane and the (meth)acrylate B; and
   a urethane (meth)acrylate D which has no aromatic ring, excluding an organopolysiloxane, the (meth)acrylate B and the epoxy (meth)acrylate C,
   wherein the antioxidant contains an antioxidant having a phenol moiety, and an antioxidant having a sulfide moiety excluding the antioxidant having a phenol moiety,
   wherein to a total mass of the metal oxide fine particles A, the (meth)acrylate B, the organopolysiloxane, the epoxy (meth)acrylate C and the urethane (meth)acrylate D, the proportion of the organopolysiloxane is from 15 to 37 mass %, the proportion of the metal oxide fine particles A is from 15 to 40 mass %, the proportion of the (meth)acrylate B is from 20 to 50 mass %, the proportion of the epoxy (meth)acrylate C is from 4 to 22 mass %, and the proportion of the urethane (meth)acrylate D is from 5 to 32 mass %,
   wherein the total mass of the metal oxide fine particles A, the (meth)acrylate B, the organopolysiloxane, the antioxidant and the radical polymerization initiator is 61.7-90.4 mass %, relative to a mass of the curable composition,
   wherein the organopolysiloxane is represented by Formula (F1),

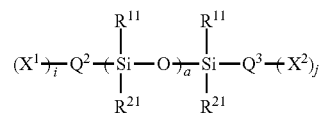

Formula F1 wherein a is from 2 to 300,
$R^{11}$ and $R^{21}$ are each independently a $C_{1-6}$ alkyl group or a hydrogen atom,
i and j are each independently from 0 to 2,
$Q^2$ and $Q^3$ are each independently a $C_{1-6}$ alkyl group when i and j are 0, a single bond or a $C_{1-6}$ alkylene group when i and j are 1, and a $C_{1-6}$ trivalent hydrocarbon group when i and j are 2,
$X^1$ and $X^2$ are $-CR^7=CH_2$, where $R^7$ is a hydrogen atom, a methyl group, or
$Si(R^8)_b(OR^9)_{3-b}$, where $R^8$ and $R^9$ are each independently a $C_{1-3}$ alkyl group, and
b is from 0 to 3.

2. The curable composition according to claim 1, wherein: to 100 parts by mass of the total mass of the metal oxide fine particles A, the (meth)acrylate B, the organopolysiloxane, the epoxy (meth)acrylate C and the urethane (meth)acrylate D, the proportion of the antioxidant is from 0.1 to 10 parts by mass, and the proportion of the radical polymerization initiator is from 0.1 to 10 parts by mass.

3. The curable composition according to claim 1, wherein the metal species of the metal oxide fine particles A is at least one member selected from the group consisting of Si, Zr, Ti, Al, Ce, Fe, W, Zn and Y.

4. The curable composition according to claim 1, wherein the metal oxide fine particles A are at least one member selected from the group consisting of $SiO_2$ fine particles, $ZrO_2$ fine particles and $TiO_2$ fine particles.

5. The curable composition according to claim 1, wherein the metal oxide fine particles A are either one or both of $SiO_2$ fine particles and $ZrO_2$ fine particles.

6. The curable composition according to claim 1, wherein the transmittance of light having a wavelength of 400 nm per 1 mm in thickness of a cured product of the curable composition, is at least 30%.

7. The curable composition according to claim 1, wherein to the total mass of the metal oxide fine particles A, the (meth)acrylate B, the organopolysiloxane, the epoxy (meth)acrylate C and the urethane (meth)acrylate D, the proportion of the organopolysiloxane is from 20 to 37 mass %.

8. A cured product formed by curing the curable composition as defined in claim 1.

9. A laminate comprising a cured product formed by curing the curable composition as defined in claim 1, and an inorganic compound layer formed on the cured product.

10. The laminate according to claim 9, wherein the inorganic compound forming the inorganic compound layer contains at least one metal species selected from the group consisting of Si, Zn, Zr, Ti, Ta, Nb, In, Sn, Y, W, Al, Cr and Ga.

11. The laminate according to claim 9, wherein the inorganic compound forming the inorganic compound layer is at least one member selected from the group consisting of $SiO_2$, SiC, ZnO, $ZrO_2$, $TiO_2$, $Ta_2O_5$, $Nb_2O_5$, $In_2O_3$, $SnO_2$, $Y_2O_3$, $WO_3$, $Al_2O_3$, TiC, TiN, $Cr_2O_3$ and $Ga_2O_3$.

* * * * *